June 9, 1936.   E. J. WILSON   2,043,362
DRAGLINE FAIRLEAD ASSEMBLY
Filed Aug. 8, 1934   4 Sheets-Sheet 1

INVENTOR.
Emery J. Wilson
BY Slough + Canfield
his ATTORNEYS.

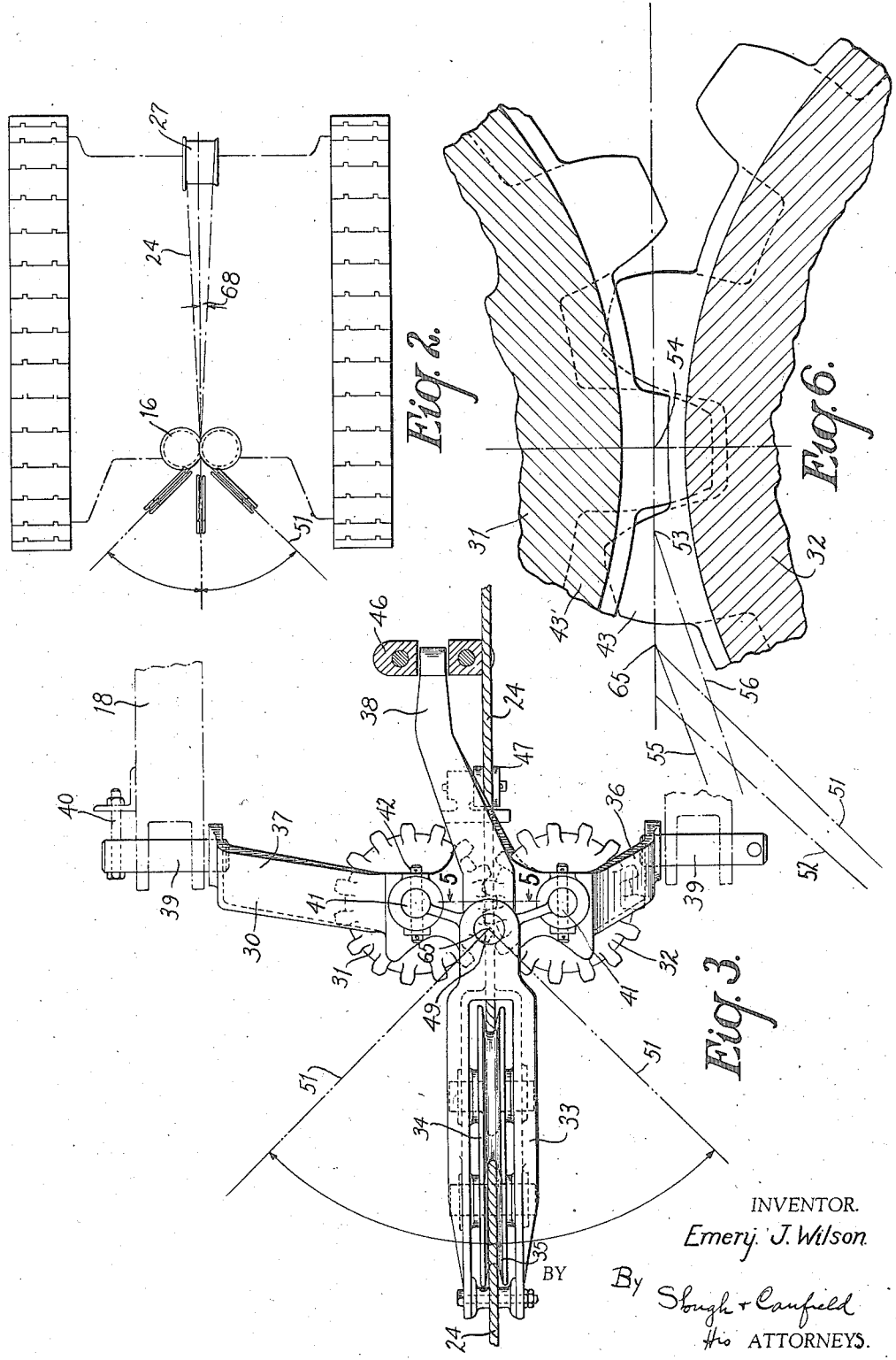

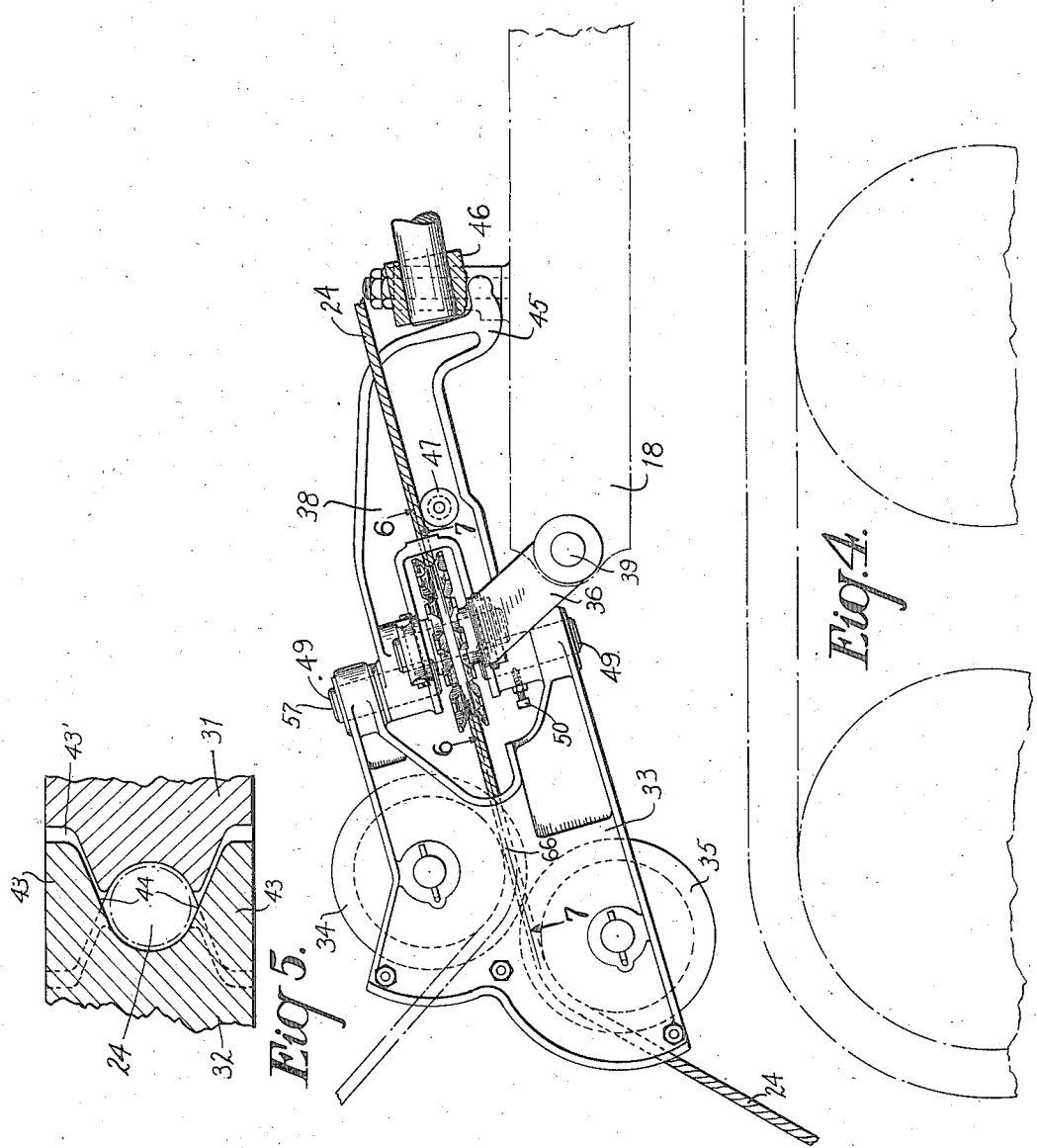

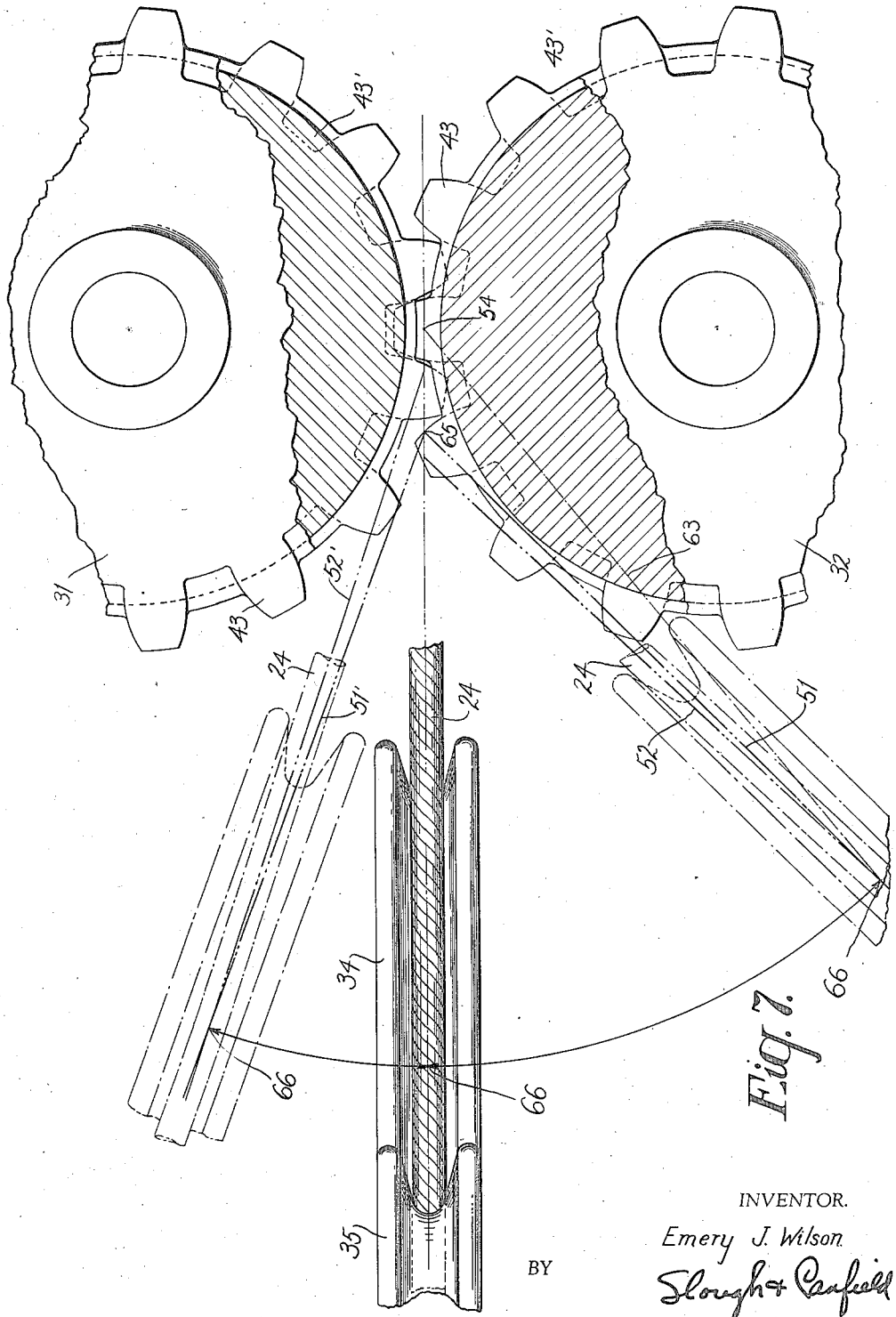

Patented June 9, 1936

2,043,362

UNITED STATES PATENT OFFICE 2,043,362

DRAGLINE FAIRLEAD ASSEMBLY

Emery J. Wilson, Cleveland, Ohio, assignor to Thew Shovel Company, Lorain, Ohio, a corporation of Ohio Application August 8, 1934, Serial No. 738,989

8 Claims. (Cl. 254—190)

This invention relates to drag line arrangements for drag buckets or scoops as used in auxiliary or replaceable arrangements of the ordinary power shovel, and more particularly relates to an improved arrangement of the sheaves guiding the drag line.

It is an object of my invention therefore to provide an improved drag line arrangement for power shovels and the like which will minimize wear and tear on the drag line.

Another object is to provide an improved drag line arrangement for power shovels and the like which will reduce side cast or side lead of the drag line to a minimum.

Another object is to provide an improved drag line arrangement for power shovels or the like which can be easily detachably secured to the shovel.

Another object is to provide an improved drag line arrangement for power shovels and the like which will permit the drag bucket or scoop to be manipulated closely adjacent the shovel truck.

Other objects of the invention and the invention itself will become increasingly apparent from a consideration of the following description and drawings, wherein:

Fig. 2 is a plan view partially diagrammatic and illustrating various operative positions of the drag line and guiding sheaves;

Fig. 3 is an enlarged plan view of the sheave arrangement illustrated in Fig. 2;

Fig. 4 is an elevational view of the sheave arrangement of Fig. 3;

Fig. 5 is a transverse sectional view taken along the line 5—5 of Fig. 3;

Fig. 6 is an enlarged fragmentary sectional view taken along line 6—6 of Fig. 4; and Fig. 7 is an enlarged fragmentary sectional view taken along line 7—7 of Fig. 4.

Figure 1:
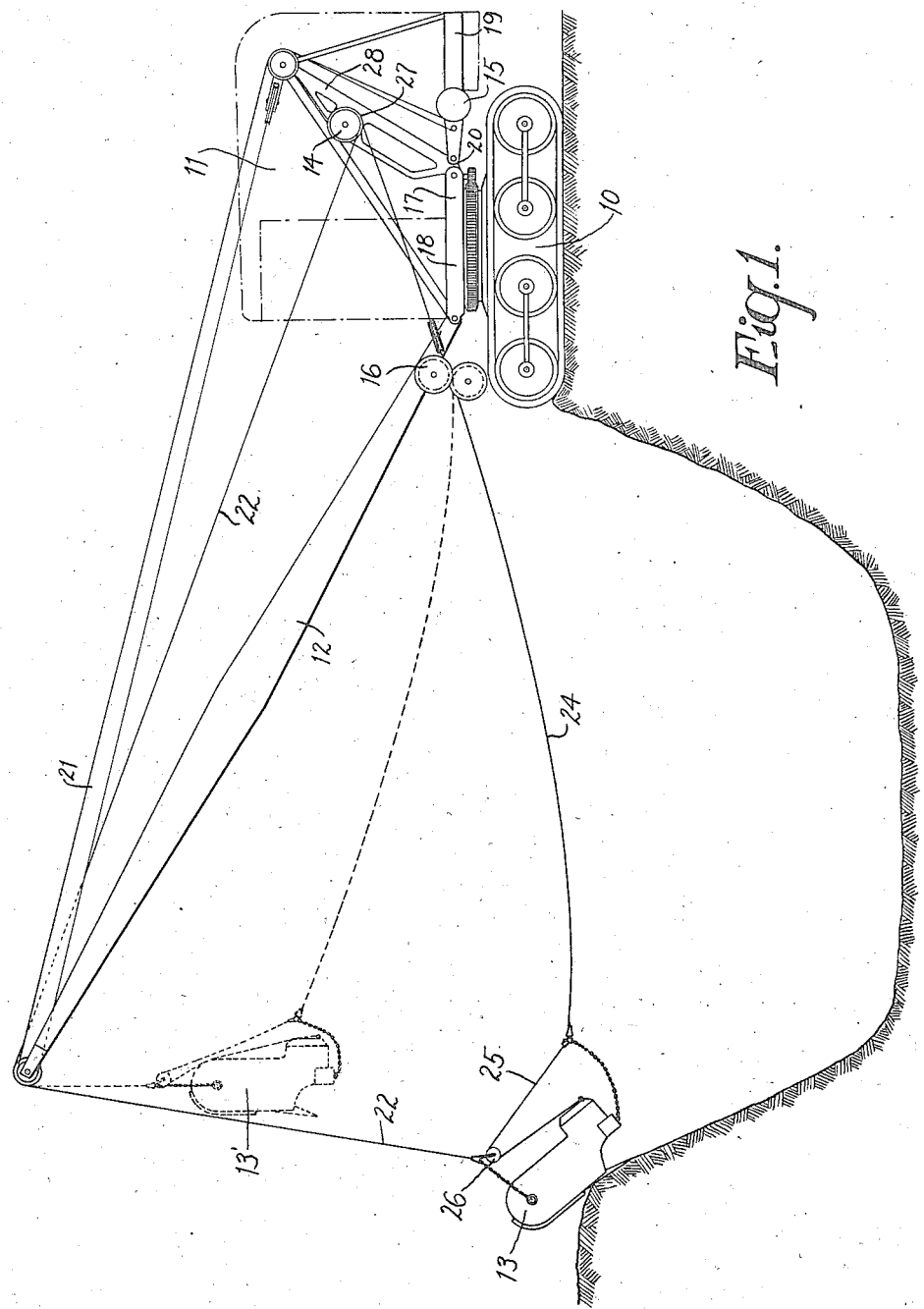
Fig. 1 is an elevational view partially diagrammatic of a power shovel with a drag line arrangement embodying my invention.

Referring now to the drawings and particularly to Fig. 1, I have illustrated at 10 a shovel truck or crawler mechanism rotatably supporting the shovel superstructure, generally indicated at 11, and including a boom 12 and scoop 13. The superstructure 11, including power drums 14 and 15 and drag line guiding sheave assembly, hereinafter called the fairlead assembly, 16, is mounted upon a two-part turntable bed generally indicated at 17 and comprising a front turntable bed 18 and a rear turntable bed 19, the turntable beds being preferably pivotally linked as indicated at 20.

The boom 12 is pivotally connected in a conventional manner at its foot to the forward end of the front turntable bed and is supported at its peak end by cables, generally indicated at 21. The derricking of the boom is controlled by rotation of the power drum 15 operable in a well known manner from the shovel power unit through a suitable clutch and gear train, and lowering of the boom is controlled preferably through suitable brake mechanism.

Raising and lowering of the drag bucket or scoop 13 is effected by a cable 22 passing over suitable sheaves disposed at the boom peak and operable by a reversibly rotatable power-driven drum 14 in any well known manner. The raising and lowering of the boom and the drag bucket constitute no essential part of my invention and may be effected in various ways well known in the art.

The drag bucket 13 is positioned at a desired point by rotation of the shovel superstructure including the boom upon the supporting truck 10 with the drag bucket suspended from the boom peak, the drag mechanism being manipulated in a manner well understood in the art. In operation, assuming the drag bucket to be in the position illustrated in solid lines in Fig. 1, the bucket is dragged inwardly towards the truck by the drag line 24 along the surface of the excavation, gradually accumulating a load during its movement, a corresponding slack in the hoist cable 22 accompanying the inward movement of the drag line effected by its winding drum 14. To maintain the drag bucket in a proper operative position, it is customary to connect the drag line 24 with a line 25 passing over a sheave 26 secured to the end of the hoist line 22. When a maximum load in the bucket is attained, and the bucket has assumed a load carrying position upon approaching the shovel truck, the bucket is moved upwardly towards the peak end of the boom by reversing the motions of the drum 14. Tension is maintained on the drag line during this operation to continue the bucket in its load carrying position, and when the bucket reaches a desired position adjacent the boom peak, the shovel superstructure including the boom is rotated until the bucket is positioned at a desired point, whereupon, by relieving the tension of the drag line, the bucket is emptied by gravity, assuming the position illustrated at 13' in Fig. 1, and the cycle is thus repeated.

Although it is desirable that the drag bucket be maintained directly beneath the boom, or in a substantially vertical position relative to the boom, the swinging of the boom frequently overtakes the movement of the drag bucket resulting in considerable horizontal angularity of the drag line relative to the boom and turntable. This side cast has resulted in considerable wear and tear on the drag line and associated mechanism.

The fairlead assembly 16 is adapted to reduce this wear and tear to a minimum.

The drag line passes from the drag bucket through suitable sheaves of the fairlead assembly 16 mounted at the forward end of the front turntable bed 18 and thence to a power-driven drum 27 preferably mounted coaxially with drum 14, the drum 27 being driven from the power unit in any suitable manner.

As best illustrated in Figs. 1 and 2, I preferably mount the operating drum 27 for the drag line on rearwardly inclined supporting posts 28, as more fully described in my copending application Serial No. 720,277, filed April 12, 1934, whereby the drum 27 will be disposed a relatively great distance rearwardly of the fairlead assembly 16, minimizing the amount of side lead of the drag line portion between drum 27 and the fairlead assembly 16. It is obviously desirable that the angle between the center line of the drum 27 and the extreme operative position of the drag line, as indicated at 68, be reduced to a minimum, and this is effected by mounting the drum 27 as described.

Effecting as nearly a direct pull on the drag line as possible, not only insures the maximum of transmitted power thereby but reduces wear on the drag line, on the drum 27, and on the sheaves of the fairlead assembly.

The fairlead assembly, generally indicated at 16, comprises a preferably cast steel member 30 forming a support for generally horizontally disposed sheaves 31 and 32 and a preferably cast steel member 33 forming a mounting for vertically disposed sheaves 34 and 35, the member 33 being pivotally supported by the member 30.

The member 30 comprises transversely extending arms 36 and 37 and a rearwardly extending arm 38, the arms 36 and 37 terminating in vertically disposed bosses provided with transversely aligned perforations whereby the member 30 may be pivotally supported by pins 39—39 projected through the said perforations. The pins 39 also form a pivotal support for opposite sides of the boom foot and engage bifurcated portions at opposite sides of the front turntable bed 18, the pins 39 being maintained against transverse movement relative to the turntable bed by bolts 40 projected through the pins and removably secured to the turntable bed 18.

The arm 37 of the element 30 is provided with aligned vertically spaced perforations through which is projected a pin 41 forming a bearing for the sheave 31, the pin 41 being prevented from vertical and rotative movement by pins 42 engaging bosses provided on the arm 37 at either side of the sheave 31. The sheave 32 is mounted in a similar manner and is transversely aligned with and spaced from the sheave 31. Sheaves 31 and 32 are thus rotatably mounted on the pins 41 and to insure that they will be concurrently rotated and will closely confine the drag line disposed therebetween they are provided with interengaging teeth 43, as best illustrated in Figs. 5, 6, and 7.

Sheaves 31 and 32, as illustrated in Fig. 5, are provided with the conventional generally V-shaped groove indicated at 44, the base of the groove being rounded to conform generally to the size of the line 24, but the groove walls are provided with transversely aligned teeth, the teeth of sheave 32 being indicated at 43, and intermediately disposed transversely aligned pockets 43' adapted to engage the co-operating teeth of sheave 31.

Thus, the toothed walls of the grooves extend transversely beyond the line 24 permitting the line to be relatively closely confined by the co-operating grooves of sheaves 31 and 32 while affording a maximum surface limiting vertical movement of the line which might be occasioned by a sudden loosening or tightening of the same without danger of undue wear as might be caused with axially extending grooves intermediate the sheaves and above and below the line as would be normally necessary without interengaging teeth.

Additionally, the above mentioned construction of the sheaves permits of a desired close confinement of lateral movements of the line 24 whereby excess whipping action of the line as the drag bucket 13 is reversibly swung from side to side is prevented with a consequent saving in wear on the drag line and sheaves. Further, the sheaves 31 and 32 must necessarily rotate at the same speed in any operative position and since this is effected by frictional contact with the drag line, and which would be greater at one sheave than the other in other than a straight ahead position, the result in independently rotatable sheaves would be to slide the drag line relative to one sheave resulting in excessive wear on the engaging parts.

The vertically disposed arm 38 extending generally longitudinally of the turntable is generally I-shaped in cross-section and terminates rearwardly in an offset hook portion, as indicated at 45, the hook portion 45 being adapted to be projected within a bracket 46 of inverted U-form secured to the turntable bed 18 whereby the member 30 will be maintained in a desired generally horizontal position relative to the turntable.

The fairlead assembly may thus be easily mounted upon the turntable merely by removing one of the bolts 40 maintaining the hinge pins 39 in position and moving the pin 39 outwardly a sufficient distance to permit one of the arms, such as arm 36 of member 30, to have the bore thereof telescoped over the opposite pin 39 which is maintained in fixed position, and then the opposite pin 39 is again moved inwardly to engage the bore of the arm 37, the pin 39 then being secured by means of the bolt 40.

During this mounting operation the hook portion 45 of the arm 38 will be projected within the U-shaped bracket 46, a slight clearance sufficient to insure that the arm 38 may easily be engaged by the bracket 46 being provided. Member 30 will thus be maintained in substantially fixed position relative to the turntable and slightly inclined forwardly, as indicated in Fig. 4.

To insure that the drag line 24 is maintained in proper alignment relative to sheaves 31 and 32, a pulley 47 is rotatably mounted on the arm 38 rearwardly of the said sheaves, and which effects guiding movement of the underside of the drag line.

The element 33, which is essentially a housing for vertically disposed sheaves 34 and 35, is pivotally secured to the element 30 by means of pins 49 fixedly secured within aligned bored portions of the element 30. The housing 33 is provided with a rearward bifurcated portion terminating in aligned bored bosses having the inner faces thereof bearing against bearing surfaces of the element 30, the housing 33 being secured by projecting pins 49 through the said bosses and securing the pins by means of set screws or the like 50.

By referring to Figs. 3, 6, and 7, it will be seen that the axis of swing indicated at 65 of the housing 33 and the sheaves 34 and 35 supported thereby intersects a line extending longitudinally of the turntable and which is tangent to the pitch circles of the sheaves 31 and 32 and that the axis 65 is disposed substantially forwardly of said point of tangency. The maximum lateral swing range of the bucket relative to the boom will be 45° and which position will determine the maximum swing of the vertically disposed sheaves 34 and 35, as illustrated in Fig. 3. It is obvious that if the axis of swing of the sheaves 34 and 35 were disposed rearwardly of that shown as at point 54 so that it would pass through the point of tangency of the pitch circles of the horizontally disposed sheaves, the drag line when in extreme swing position, such as indicated at 51, Fig. 7, would tend to ride over a chord of the sheave 32, as indicated by dotted line 63, and although restrained from so doing, it would considerably increase the wear and tear both on the drag line and on the sheaves.

Referring again to Figs. 3, 4, 6, and 7, and particularly Fig. 7, it will be seen that the housing 33 and its associated vertically disposed sheaves 34 and 35 when in a maximum lateral swing position relative to the boom, will assume a position indicated by the line 51, this position being determined by a line joining the axis of swing 65 of the sheaves 34 and 35 and the point of connection of the drag line with the drag bucket. However, the center line of the drag line will only coincide with line 51 from a point such as 66, indicated in Figs. 4 and 7, where the drag line engages the sheave 34 outwardly to the drag bucket. The portion of the drag line intermediate point 66 and the sheave 32 will assume a position indicated by line 52, this position being determined by the point of tangency of the drag line with the sheave 32 (the center line of the drag line being used for the illustration).

It will be clearly seen by reference to Fig. 7 that the side lead of the drag line relative to the sheave 32 and as evidenced by the angle between lines 51 and 52 is relatively small and only a fractional part of the angle between lines 52 and 63 representing the side lead if employing the conventional axis of swing 54.

Lines 51' and 52' indicate the relative position of the drag line 24 and the horizontal center line of the sheaves at an intermediate position and although the side lead is slightly increased, it is relatively small. It is obvious that in a straight ahead position, there will be no side lead and as previously pointed out, the side lead at an extreme swing position is less than an intermediate position, so that the angle between lines 51' and 52' represents the maximum side lead encountered by this novel construction.

Thus, the aforementioned drag line arrangement permits an easy method of adapting the ordinary power shovel to drag bucket operations wherein side lead and resultant wear and tear on the drag line and associated parts is reduced to a minimum, both as to the drag line portion extending to the operating drum and the portion of the drag line engaging the fairlead assembly.

Although I have shown and described a preferred embodiment of my invention, I contemplate that numerous and extensive departures may be made therefrom without departing from the spirit of my invention and the scope of the appended claims.

Having thus described my invention, what I claim is:

1. In a drag line arrangement for excavating machines, a supporting member adapted to be secured in fixed relation to the machine, a pair of sheaves rotatively supported by said member, each of said sheaves being provided with transversely aligned teeth and an intermediate circumferential groove whereby a drag line may be confined by the cooperating groove portions of the sheaves and the laterally disposed confronting inner faces of the inter-engaging teeth, and a second pair of sheaves laterally swingable about a common axis, the said axis being disposed forwardly of the point of tangency of the pitch circles of the first pair of sheaves.

2. In a drag line sheave arrangement for excavating machines, a supporting member adapted to be secured in fixed relation to the machine, a pair of sheaves rotatively supported by said member, each of said sheaves being provided with transversely aligned teeth and an intermediate circumferential groove whereby a drag line may be confined by the cooperating groove portions and laterally disposed confronting inner faces of the inter-engaging teeth, a second member pivotally supported about an axis extending at right angles to the plane of the said sheaves, a second pair of individually rotatable sheaves supported by the second member adapted to maintain a drag line extending from the first pair of sheaves to the second pair of sheaves substantially in the plane of the first pair of sheaves.

3. The drag line sheave arrangement as described in claim 2, and wherein a guide element is disposed rearwardly of the first pair of sheaves and adapted to maintain a drag line portion extending from said guide element to the first pair of sheaves, substantially in the plane of the first pair of sheaves.

4. A drag line arrangement for excavating machines employing a drag bucket comprising a pair of generally horizontally disposed sheaves adapted to be mounted at the forward end of the machine and interengaging whereby rotation of one sheave effects rotation of the other, the axes of rotation of said sheaves being included in a generally vertical plane extending transversely of the machine, and a second pair of generally vertically disposed and laterally swingable sheaves having a common axis of swing disposed forwardly of and generally parallel to said plane, the sheaves being adapted to have a drag line reeved successively through the first and second pair of sheaves and affixed to the drag bucket.

5. A fairlead assembly for drag lines and the like comprising a pair of sheaves disposed in a common plane and interengageable whereby rotation of one sheave effects concurrent rotation of the other, the sheaves providing a substantially circular passage therebetween in the plane including the sheave axes, a second pair of sheaves swingable about an axis intersecting the plane of the first pair and spaced from the plane of the axes of the first pair of sheaves.

6. A fairlead assembly for drag lines and the like comprising a pair of sheaves disposed in a common plane provided with mutually overlapping portions forming a generally circular passage therebetween and effecting concurrent rotation of the sheaves, and a second pair of sheaves swingable about an axis extending substantially at right angles to the plane of the first set of sheaves and spaced forwardly of a line interconnecting the axes of the first set of sheaves.

7. A fairlead assembly for drag lines and the like comprising a pair of sheaves having mutually overlapping portions effecting concurrent rotation of said sheaves and forming a drag line passage therebetween, mounting means for said sheaves adapted to rigidly and detachably secure the same to a support, a second set of sheaves carried by the mounting means and swingable about a common axis generally parallel to the axes of the first set of sheaves and disposed forwardly of a plane including the axes of the first said set.

8. A fairlead assembly for drag lines and the like comprising a transversely extending member adapted to be pivotally secured to a support, a pair of mutually interengaging sheaves disposed in a common generally horizontal plane and rotatably supported by said member, said member having a rearwardly extending portion adapted to detachably engage a support, and a second pair of vertically disposed sheaves laterally swingable about a generally vertical axis disposed forwardly of a line joining the axes of the first pair.

EMERY J. WILSON.